(12) United States Patent
Sloan et al.

(10) Patent No.: US 6,483,857 B1
(45) Date of Patent: Nov. 19, 2002

(54) METHOD AND APPARATUS FOR TRANSMITTING CONTROL INFORMATION OVER AN AUDIO DATA STREAM

(75) Inventors: David G. Sloan, Dollard-des-Ormeaux (CA); Chung Cheung C. Chu, Brossard (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/306,541

(22) Filed: May 7, 1999

(51) Int. Cl.[7] .................................................. H04N 7/12
(52) U.S. Cl. ........................ 370/522; 370/466; 370/467; 370/529; 370/535
(58) Field of Search ................................ 370/465, 466, 370/467, 468, 472, 476, 522, 527, 528, 529, 535, 536, 537, 538, 540, 542, 543

(56) References Cited

U.S. PATENT DOCUMENTS

| | | | |
|---|---|---|---|
| 4,730,312 A | | 3/1988 | Johnson et al. |
| 4,750,173 A | | 6/1988 | Blüthgen |
| 5,007,050 A | * | 4/1991 | Kasparian et al. ........... 359/114 |
| 5,768,308 A | | 6/1998 | Pon et al. |
| 6,172,988 B1 | * | 1/2001 | Tiernan et al. ............... 370/465 |
| 6,236,805 B1 | * | 5/2001 | Sebestyen ............... 375/240.01 |
| 6,275,537 B1 | * | 8/2001 | Lee .......................... 348/423.1 |

* cited by examiner

Primary Examiner—Ricky Ngo

(57) ABSTRACT

The invention relates to a method and apparatus for transmitting control information over an audio data stream, such as PCM coded speech information. The device comprises a control unit having two inputs receiving the PCM speech samples and control information signal. Each PCM sample is made up of a plurality of bits arranged according to different significance positions, such as position 0, 1, 2, 3, __N, where N+1 is the number of bits in the sample. The control unit receives a selected sample and shifts a bit at a selected significance position to a lower significance position. The empty slot at the predetermined significance position is used to receive a bit from the control information signal. The compound signal thus obtained is then released over a transport path, such as a T1 link, for transmission to a remote location. At the receiver, the control information bit is extracted from the selected sample at the predetermined significance position, and the PCM speech sample is recovered by shifting upwardly at least one bit at a significance position lower than the selected significance position.

37 Claims, 3 Drawing Sheets

A

B

METHOD AND APPARATUS FOR TRANSMITTING CONTROL INFORMATION OVER AN AUDIO DATA STREAM

FIELD OF THE INVENTION

This invention relates to signal processing and more particularly to a method and apparatus for transmitting control information over an audio data stream. This invention finds applications in digital communication systems, such as a digital cellular system or a Voice-over-IP (VoIP) network, in particular codec bypass capable systems that can selectively de-activate encoding/decoding functions in the connection to provide improved speech quality.

BACKGROUND OF THE INVENTION

In a digital communication system such as a wireless network or a VoIP network, an audio signal may be processed by a series of speech encoders and decoders as it is transmitted from one endpoint to another. In the example of a cellular mobile-to-mobile connection, the audio signal is first encoded by a speech encoder at the first mobile telephone and transmitted in an encoded format to a base transceiver station of a cell site where it is transferred to the base station controller servicing that cell site. At the base station controller, the encoded speech information is processed by a compatible speech decoder that converts the compressed speech stream into PCM samples. The PCM samples are then transported over the landline network, such as the PSTN, toward the base station controller servicing the cell site communicating with the other mobile telephone. At the second base station controller, the PCM speech samples are again processed by a speech encoder. The encoded information is sent from the base transceiver station of the cell site to the second mobile telephone where the compressed speech stream is converted one more time by a speech decoder into PCM samples that can be used to generate an audio signal.

In this example, codecs on both sides of the mobile-to-mobile call are connected in tandem, which is known to degrade the speech quality as a result of the successive encoding/decoding of the audio signal.

The "codec bypass" technique alleviates this problem. During a connection, when the codecs at the base station controllers are made aware of their mutual existence, they are switched off such that the encoded speech information arriving at the first base station controller flows into encoded format through the PSTN and arrives as such at the second base station controller. This procedure eliminates one decoding operation of the speech signal at the first base station controller and one re-encoding operation of the signal at the second base station controller. As a result, the audio quality is significantly improved.

For additional information on the "codec bypass" technique, the reader is invited to refer to the U.S. Pat. No. 5,768,308 granted to the same assignee that describes the process in great detail. The contents of this document are hereby incorporated by reference.

The codec in one base station controller can switch to the bypass mode as a result of an in-band hand-shaking operation with the companion codec in the other base station controller. Transmitting control information from one codec to the other over the audio data stream allows this hand-shaking operation to take place. The control information is transmitted by bit stealing. This is effected by inserting in selected PCM samples bits from the control information signal. The control information bit is inserted at a position of pre-determined significance in the sample. Since this insertion mechanism destroys the audio information bit at the position of predetermined significance, it is desirable to carry out the insertion at the lowest possible bit significance position. In a specific example, a T1 connection between the two codecs may require signalling information to be embedded in some speech samples at the least significant bit position, where this signalling information is necessary for the transmission facility linking the two codecs. Accordingly, the control information is sent over the next available bit position, specifically bit significance position 1. This effectively destroys the audio information at bit significance position 1 in every sample carrying control information.

Although the above described technique allows obtaining an overall good speech quality, it would be desirable to effect the transmission of the control signal while avoiding as much as possible the loss of the audio information in the bit position in which the control information bit is carried.

SUMMARY OF THE INVENTION

The present invention provides a device and a method for transmitting control information over an audio data stream. This device can be used in a digital communication system implementing the "codec bypass" feature, for example a Time Division Multiple Access (TDMA) system or a Code Division Multiple Access (CDMA) system. The device comprises a first input for receiving the audio data stream, the audio data stream being characterised by a plurality of data blocks, each block including a plurality of bits arranged in different significance positions. The device also includes a second input for receiving a control information signal including a plurality of bits. A control unit is coupled to the first and to the second inputs to insert in selected data blocks of the audio data stream bits from the control information signal. More particularly, the control unit is operative to shift a bit at a selected significance position in a data block to a lower significance position and insert a bit from the control signal at the vacated selected significance position of the data block. More than one bit can be shifted to lower significance positions if more positions in the data block are to be vacated so that more than one control information bit can be inserted in the data block.

The resulting signal is then released from the device for transmission to a remote location. In a specific example, the data block is a PCM sample.

Preferably, at the receiving end of the transmission, the multiplexed audio data stream and the control information signal are separated. The operation involves, for selected ones of the data blocks, extracting a bit at a first pre-determined significance position and shifting the bit(s) at significance position(s) below the first pre-determined significance position towards the first pre-determined significance position. The extracted bits from the selected data blocks can then be used to assemble the control information signal, while the selected data blocks with the shifted bits can be used in the formation of the audio stream suitable for further processing.

The bit shifting allows preserving an audio information bit in the data block, that would be lost under prior art bit stealing transmission techniques. Objectively, a bit loss will also occur in some samples that receive, in addition to a control information bit a signalling information bit. This event does not occur very often as most of the data blocks selected for carrying information other than audio information carry either control information or signalling information but not both. Note that, in a specific example, the transmission facility linking the two codecs may be a single T1 link formed of a series of T1 connections having unsynchronised symmetry. In such a situation, the multiple T1 signalling has a higher chance of coinciding with the control bits, such that a particular data block may be selected to carry both control and signalling information.

The invention also provides a device and a method for demultiplexing a compound digital signal into audio data and a control information signal.

Yet, the invention also provides a data structure containing audio and control information implemented over a machine readable data transmission medium, said data structure having a bit pattern XYZ, where X is a bit set including at least one audio information bit, Y is a bit set including at least one control information bit and Z is a bit set including at least one audio information bit, when bit set Z is shifted up by the number of bits forming the bit set Y a bit word XZ being formed that is characterised by bits arranged in predetermined significance positions, the bits in the word XZ communicating in conjunction with one another audio information. In a specific example, the bit sets Y and Z contain each a single bit.

Other aspects and features of the present invention will become apparent to those ordinarily skilled in the art upon review of the following description of specific embodiments of the invention in conjunction with the accompanying figures.

DETAILED DESCRIPTION OF THE PREFERRED EMBODIMENT

Figure 1:
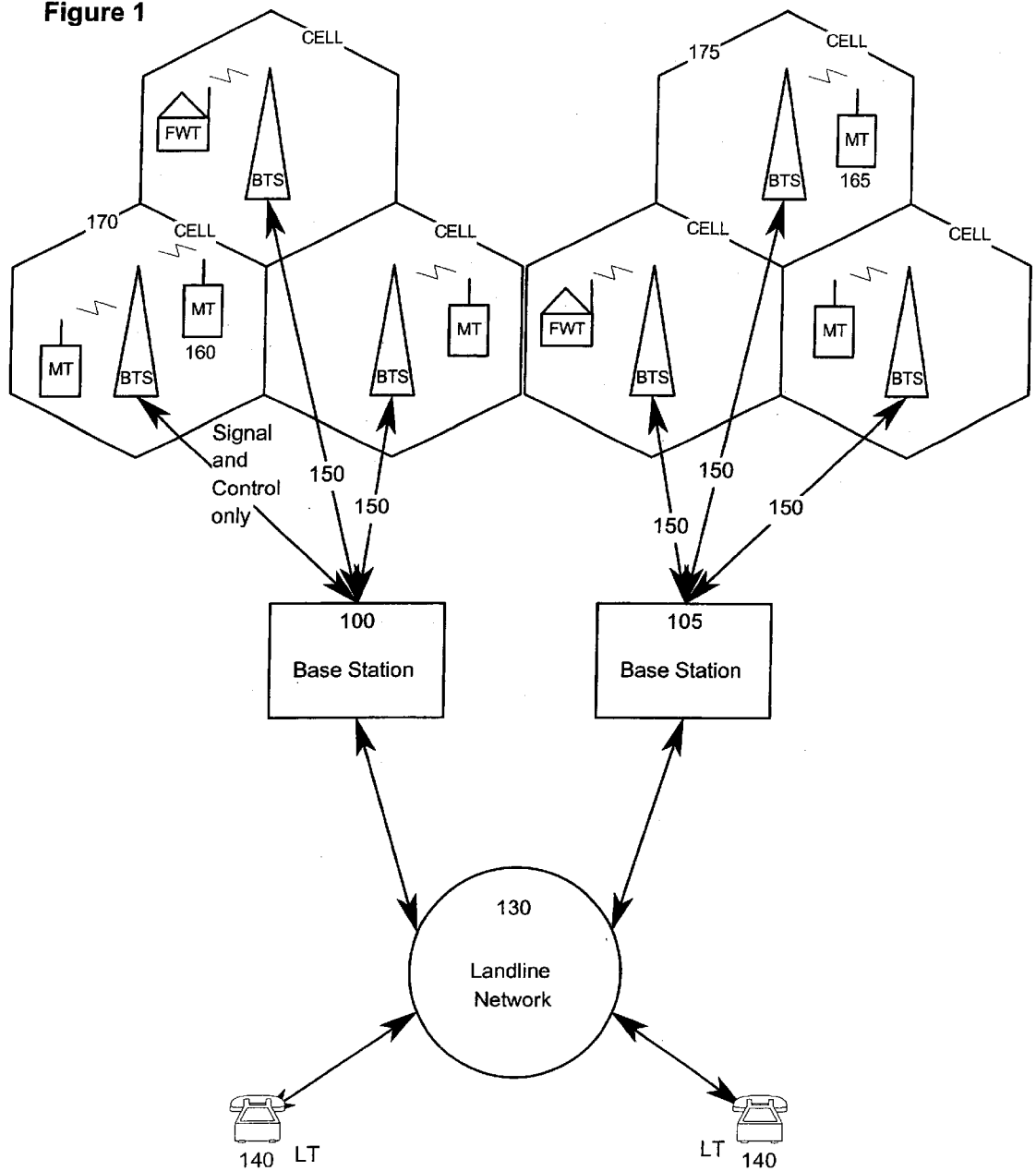
FIG. 1 is a block diagram illustrating a mobile-to-mobile connection through the PSTN.

FIG. 1 is a block diagram representation of a portion of a cellular wireless telecommunications network. In this figure, Mobile terminals (MT) are on the move in the hexagonal areas defined as cells. Fixed wireless terminals (FWT) are also included in the areas defined as cells. Each cell covers a predetermined geographical area and has a Base Transceiver Station (BTS), which communicates through radio channels with the MTs and FWTs. A typical communication protocol between the BTSs and the MTs and FWTs may be a TDMA protocol. Alternatively, the communication protocol could be a CDMA or GSM protocol, among others. For purposes of illustration, assume hereinafter that a TDMA protocol is in effect. A number of these BTSs (i.e. cells) may be connected by land line or microwave link 150 to one Base Station Controller 100, 105 (BSC), which controls handoff functions, among others, and routes the signal as requested. Each BSC 100, 105 is connected to a landline network 130. The landline network 130 way include, among others, the Public Switched Telephone Network (PSTN), the Integrated Services Digital Network and the Internet. Land terminals 140 (LT) connected to the landline network 130 are also shown for completeness.

In a specific call scenario, a first subscriber 160 is communicating with a second subscriber 165 via a first cell site 170 and BSC 100 and a second cell site 175 and BSC 105. The BSCs 100 and 105 communicate with each other over the landline network 130.

Figure 2:
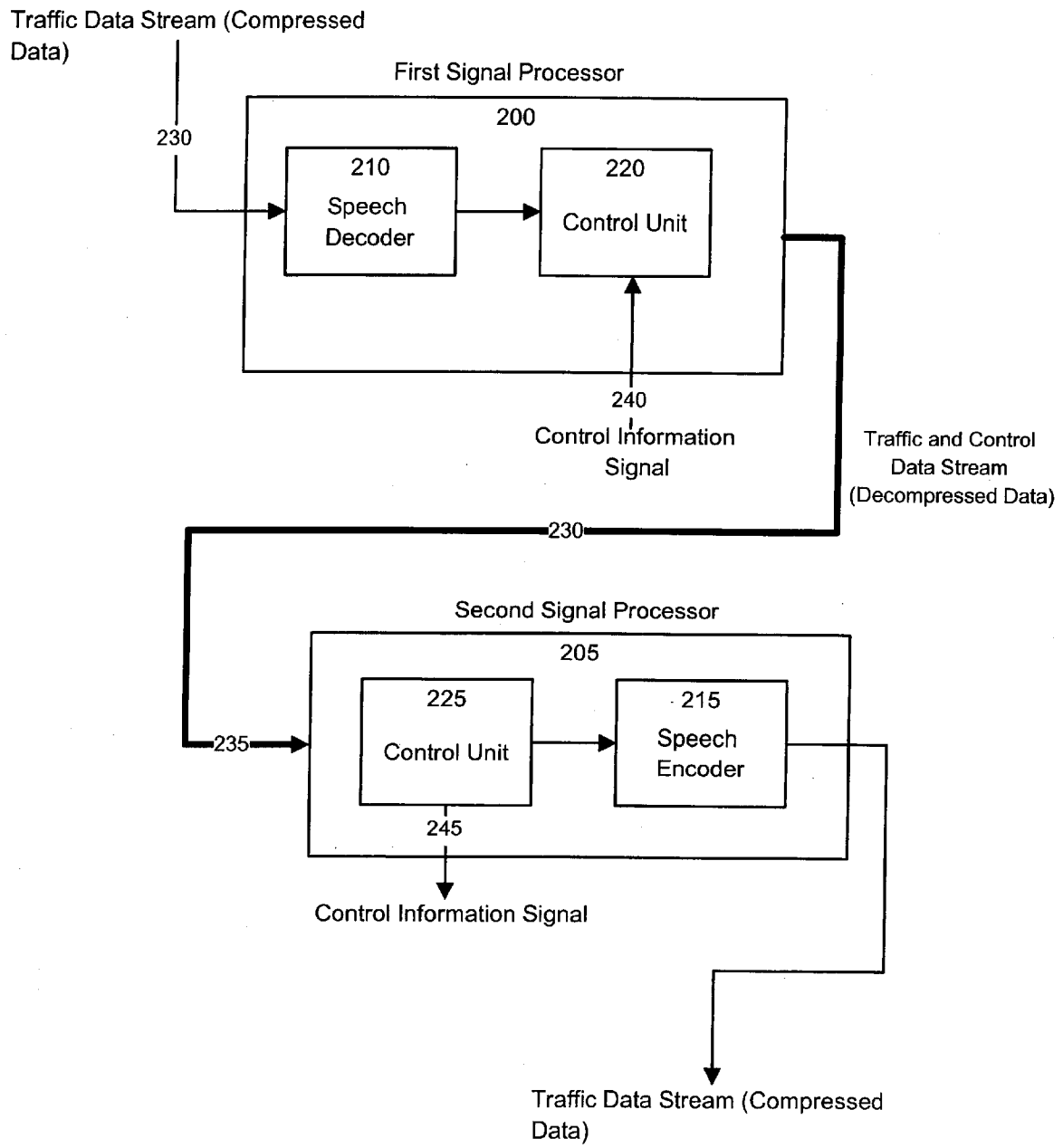
FIG. 2 is a block diagram illustrating the signal processors in two respective base station controllers that implement the novel device for transmitting control information over an audio data stream.

Each BSC 100, 105 comprises a digital signal processor. With reference to FIG. 2, the signal processor 200 is associated with the BSC 100, while the signal processor 205 is associated with the BSC 105. The digital signal processor 200 includes a speech decoder 210 that provides the capability of voice transcoding from a compressed format, such as IS-54 or IS-641-A, to mu-law (or A-law PCM depending on which standard is being used). The digital signal processor 205 includes a speech encoder 215, compatible with speech decoder 210, which carries out the reverse transformation. In a particular example, the speech encoder 210 is a VSELP (Vector Sum Excited Linear Prediction) encoder, while the speech decoder 215 is a compatible VSELP decoder.

The digital signal processors 200 and 205 are connected to one another by a transmission facility 230 that could be a signal transmission path through the landline network 130. For the purpose of this example, the transmission facility 230 includes a T1 connection. As it is known to those skilled in the art, the transmission protocol of a T1 line may require transmitting over the data signal a signaling information signal. This is effected by replacing in selected PCM samples (assuming that the data signal is PCM encoded) the least significant PCM sample bit with a signaling information bit.

The digital signal processor 200 also includes a control unit 220 that multiplexes the audio data incoming from the mobile telephone 160 with a control information signal such that a handshaking procedure can be effected between the digital signal processors 200 and 205 to establish, if possible, a codec bypass condition. Also, a control unit 225 is provided in the digital signal processor 205 to effect the reverse transformation, that is to demultiplexes the control information signal and the audio data.

It should be appreciated that the device illustrated at FIG. 2 allows a unidirectional communication from the digital signal processor 200 to the digital signal processor 205. For a full duplex communication mode, each digital signal processor must be provided with the contents of the other digital signal processor. In the interest of clarity, however, the description of the invention will be made relative to the device as depicted in FIG. 2 only.

Digital signal processors are generally comprised of multiple signal processors commercially available from a number of suppliers. One such processor is Motorola's 560001 DSP. Alternatively, the digital signal processor may be implemented only in software executed on a suitable computing platform.

When a TDMA mobile-to-mobile connection such as shown in FIG. 1 and in FIG. 2 is realized, two digital signal processors are involved in the connection. An audio data signal that is audio information in an encoded format (such encoding has been effected at the mobile telephone 160) is introduced at an input 230 of the digital signal processor 200. Without any codec bypass procedure invoked, the audio signal is passed to the decoder 210 and decoded into PCM format Next, the PCM samples are transported to the digital signal processor 205 and passed to an input thereof 235. The encoder 215 re-encodes the PCM samples that can then be sent to the mobile telephone 165.

The successive decoding/encoding operation introduces perceptible coding noise that degrades the quality of voice signal. Note that such degradation of speech quality due to successive decoding/encoding operation may occur in a digital communication system other than a wireless network, for example a packet network implementing VoIP. Further, the present invention is applicable to network configurations in which a packet network may interconnect with another network type such as a circuit switched network or a wireless network.

The codec bypass feature described in detail in the U.S. Pat. No. 5,768,308 is particularly advantageous for TDMA mobile-to-mobile communications, realized with two bypass-capable digital signal processors connected to one another as shown in FIG. 2. Codec bypass realization is based on determining that one digital signal processor is directly linked with another digital signal processor in a digital communication system connection. The bypass feature has two components: a digital signal processor communication protocol and a codec bypass mechanism.

The digital signal processor communication protocol is used to set up the communication between the digital signal processors 200 and 205 in the same mobile-to-mobile connection. Upon successful handshakes, each digital signal processor activates the bypass mechanism to transmit the mobile audio signal in encoded format to the other digital signal processor, and codec bypass is completed.

In a typical interaction, the digital signal processor 200 sends to the digital signal processor 205 a control information signal that is essentially an identifier. When the digital signal processor 205 receives this signal, it returns to the digital signal processor 200 an acknowledgement message. Upon reception of the acknowledgement message the digital signal processor 200 activates the bypass mode where essentially the decoder 210 is de-activated such that the incoming stream of encoded frames is passed as such in the transport facility 230. Finally, the digital signal processor 200 issues yet another control information signal that causes the digital signal processor 205 to acquire the bypass mode such as to de-activate the encoder 215 and cause the encoded audio frames to be transmitted directly to the mobile telephone 165.

The communication process is done via inband signalling and is independent of the speech encoding/decoding operations. For the purpose of this description it is not necessary to elaborate on how the control information signals used to perform the handshaking procedures between the digital signal processors 200 and 205 are generated nor how they are processed when received to invoke the bypass mode. For mode details on these points the reader is invited to refer to the U.S. Pat. No. 5,768,308.

Figure 3:
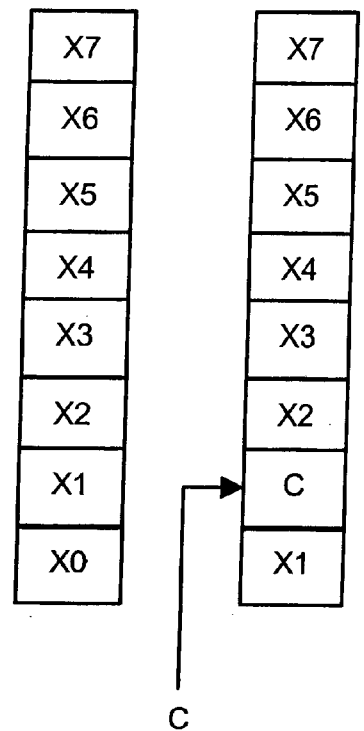
FIG. 3 is a representation of a PCM audio sample illustrating the alterations that the sample undergoes, as the control information is embedded in the sample and later removed therefrom.
Figure 3:
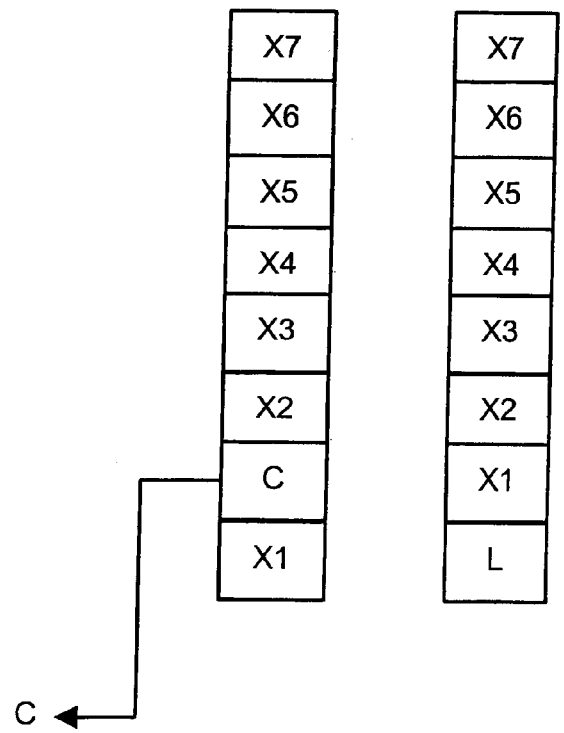

At the digital processor 200 a control unit 220 is provided to multiplex the control information signal received at an input 240 with the audio stream, namely the PCM samples output from the decoder 210. FIG. 3 illustrates the operation of the control unit 220.

The reference A shows two successive PCM samples. Each sample has 8 bits, arranged in different significance positions. The least significant bit is at bit position 0 and the most significant bit at bit position 7. The left-hand sample carries solely audio information, each bit slot is identified by the letter X (designating audio data) followed by the significance position of the bit. This sample is generated from the decoder 210 and it is passed to the control unit 220 for processing. The control unit 220 inserts in the sale a single bit from the control information signal. In doing so, the control unit 220 first shifts the audio information bit X1 to position 0, thus overwriting bit X0. The vacant slot is then used to insert the bit C from the control information signal. The resulting sample is shown at the right hand side of reference A. Alternatively, a higher significance position may be used to carry the control information bit, in which case a group of bits are shifted, as opposed to a single bit. For example, the control unit 220 first shifts the audio information bits X2 and X1 to positions 1 and 0, respectively. The vacant slot at position 2 is then used to insert the bit C from the control information signal.

This operation is performed on selected samples of the audio stream. For example, by inserting a single signal information bit in each $16^{th}$ sample, the control signal can be sent at a rate of 500 bits per second given a PCM signal rate at 64 Kbps. Usually, this is sufficient to complete the handshaking procedures between the digital signal processors 200 and 205 to effect codec bypass. Note that where a higher data rate is required for the control signal, given a constant PCM signal rate, the control information bits can be sent more frequently, for example every $12^{th}$ sample, or a selected sample may carry more than one control information bit. This would then require shifting down one or more bits by more than one position.

The PCM sample is then sent over the transmission facility 230 that may include a T1 link, as mentioned earlier. The T1 protocol may insert at bit significance position 0 a signaling information bit. There is little or no correlation between the insertion of the control information bits and the signaling information bits, such that in most instances control information bits and the signaling information bits will be distributed over different samples. In some instances, however, it might be possible that a PCM sample holding a control information bit also receives a signaling information bit. When this occurs, the bit X1 at position 0 is destroyed. However, since this event does not occur too often, the impact on speech quality is reduced.

Reference B illustrates the operation performed by the control unit 225 at the digital signal processor 205. Here the control unit 225 receives the sample on the left-hand side and extracts from the bit significance position 1 the signaling information bit C. This bit is then released from output 245 and can be used to reconstruct the control information signal by assembling it with previously received bits. Next, the control unit 225 shifts the bit at significance position 0 upwardly to bit significance position 1. The audio information bit X1 is then restored, while the bit X0 is lost as indicated by the letter L. Where the control information bit was inserted at a predetermined significance position higher than position 1, the control unit extracts the control information bit and shifts all of the bits at significance positions lower than the predetermined significance position upward towards the predetermined significance position. For example, if the predetermined significance position is position 2, the control bit is extracted therefrom and the bits at significance positions 1 and 0 shifted upward to positions 2 and 1, respectively.

In the instances where a signaling information bit has also been placed in the sample, there is a chance that the bit at position 0 is incorrect. However, since the occurrence of double bit stealing on a single sample does not occur very often, the perceptual effect of this event is minimal.

Since only a selected subset of the samples sent from digital signal processor 200 to digital signal processor 205 over the transmission facility 230 are used to transmit control information, synchronisation of the two transmission ends must be ensured. Synchronisation allows the digital signal processor 205 to know which samples are carrying control information, such that the samples selected for shifting by the control unit 225 are the same as the samples selected at the digital signal processor 200 for receiving control information. In a specific example, the digital signal processor 205 implements a detection unit. At the digital signal processor 200, an identifier is generated and multiplexed into the sequence of control information bits for insertion into selected samples, where this identifier takes the form of a predetermined fixed bit pattern. The detection unit at the digital signal processor 205 reads each of the incoming samples and, upon detection of the predetermined fixed bit pattern, knows the position of the subsequent samples selected at the digital signal processor 200 to carry control information. Note that both of the digital signal processors 200 and 205 are aware of a predetermined frequency of transmission of control information, for example every $16^{th}$ sample contains a control information bit. Once in synchronisation with the digital signal processor 200, the digital signal processor 205 only reads the incoming samples which it believes to be selected samples carrying control information, on the basis of the predetermined frequency of transmission of control information. The detection unit continues to monitor these selected samples for the predetermined fixed bit pattern, as a precaution to certain events that may affect the synchronisation of the two digital signal processors 200 and 205, for example a transmission interrupt If a sequence of selected samples does not contain the predetermined fixed bit pattern it was expected to contain, the detection unit will check the previous and subsequent samples for the predetermined fixed bit pattern. If the predetermined fixed bit pattern is still not found, the detection unit will check each of the incoming samples for the predetermined fixed bit pattern until synchronisation is re-established.

The above description of a preferred embodiment should not be interpreted in any limiting manner since variations and refinements can be made without departing from the spirit of the invention. The scope of the invention is defined in the appended claims and their equivalents.

We claim:

1. A device for transmitting control information over an audio data stream, said device comprising:
    a first input for receiving the audio data stream, the audio data stream being characterized by a plurality of data blocks, each block including a plurality of bits arranged in different significance positions;
    a second input for receiving a control information signal including a plurality of bits; and
    a control unit coupled to said first and second inputs to insert in data blocks of the audio data stream bits from the control information signal, said control unit being operative to:
        i. shift a bit at a selected significance position in a data block to a lower significance position;
        ii. insert a bit from the control signal at the selected significance position of the data block;
    an output coupled to said control unit for releasing the data block with the control signal bit.

2. A device for transmitting control information over an audio data stream as defined in claim 1, wherein said control unit is operative to shift bits at and below a selected significance position to respective lower significance positions.

3. A device for transmitting control information over an audio data stream as defined in claim 1, wherein each data block is a PCM coded audio sample.

4. A device for transmitting control information over an audio data stream as defined in claim 3, wherein each PCM sample includes a plurality of bits arranged in significance positions 0, 1, 2, 3, _N, where N+1 is the total number of bits in the PCM sample, said selected significance position being position 1.

5. A device for transmitting control information over an audio data stream as defined in claim 4, wherein said control information is codec bypass control information.

6. A device for transmitting control information over an audio data stream as defined in claim 5, wherein said control unit is operative to insert a bit from the control information signal in every $M_{th}$ PCM coded audio sample, where M>1.

7. A device for transmitting control information over an audio data stream as defined in claim 6, wherein M is 16.

8. A device for transmitting control information over an audio data stream as defined in claim 6, wherein the control information signal is representative of a codec identifier.

9. A device for transmitting control information over an audio data stream as defined in claim 8, wherein the control information signal is representative of an acknowledgement of a remote codec identifier.

10. A device for transmitting control information over an audio data stream as defined in claim 1, wherein said control unit is a DSP chip.

11. A device for demultiplexing a compound digital signal into audio data and a control information signal, the compound digital signal being characterized by a plurality of data blocks, each block including a plurality of bits arranged in different significance positions, said device including:
    an input for receiving the compound digital signal;
    a control unit coupled to said input, said control unit being operative to:
        (a) extract from a selected data block at said input a bit from a selected significance position;
        (b) shift in the selected data block at least one bit at a significance position that is lower than the selected significance position to the predetermined significance position;
    an output coupled to said control unit for releasing the data blocks obtained at (b).

12. A device for demultiplexing a compound digital signal into audio data and a control information signal as defined in claim 11, said control unit being operative to shift bits at and below a selected significance position to respective higher significance positions.

13. A device for demultiplexing a compound digital signal into audio data and a control information signal as defined in claim 11, wherein each data block at said second output is a PCM coded audio sample.

14. A device for demultiplexing a compound digital signal into audio data and a control information signal as defined in claim 13, wherein each data block at said input includes a plurality of bits arranged in significance positions 0, 1, 2, 3, _N, where N+1 is the total number of bits in the data block at said input, said selected significance position being position 1.

15. A device for demultiplexing a compound digital signal into audio data and a control information signal as defined in claim 11, wherein said control information is codec bypass control information.

16. A device for demultiplexing a compound digital signal into audio data and a control information signal as defined in claim 11, wherein said control unit is operative to extract a bit at said predetermined significance position from every $M_{th}$ data block at said input to assemble the control information signal, where M>1.

17. A device for demultiplexing a compound digital signal into audio data and a control information signal as defined in claim 16, wherein M is 16.

18. A device for demultiplexing a compound digital signal into audio data and a control information signal as defined in claim 16, wherein the control information signal is representative of a codec identifier.

19. A device for demultiplexing a compound digital signal into audio data and a control information signal as defined in claim 18, wherein the control information signal is representative of an acknowledgement of a remote codec identifier.

20. A device for demultiplexing a compound digital signal into audio data and a control information signal as defined in claim 11, wherein said control unit is a DSP chip.

21. A transmission system, comprising:
a first signal processor;
a second signal processor; and
a transmission facility linking said first signal processor to said second signal processor,
said first signal processor being operable to convert an audio data signal from a first signal format to a second signal format for transmission on said transmission facility to said second signal processor, in the first signal format the audio data stream being characterized by a plurality of data blocks, each block including a plurality of bits arranged in different significance positions;
said second signal processor being operable to reconvert said audio data signal from said second signal format to said first signal format;
said first signal processor further being operable to transmit a first control information signal to the second signal processor over the audio data stream, said first control information signal including a plurality of bits, said first signal processor including:
(a) a first input for receiving the audio data stream;
(b) a second input for receiving the control information signal; and
(c) said first signal processor being coupled to said first and second inputs to insert in data blocks of the audio data stream bits from the control information signal, said first signal processor being operative to:
i. shift one bit at a selected significance position in a data block to lower significance positions;
ii. insert a bit from the control information signal at the selected significance position of the data block;
(d) an output coupled to said first signal processor for releasing the data block with the control signal bit in said transmission facility;
said second signal processor being responsive to said first control information signal to send a second control information signal to said first signal processor;
said first signal processor being responsive to said second control information signal to interrupt conversion of said audio data signal from said first signal format to said second signal format so that said audio data signal is transmitted from said first signal processor to said second signal processor in said first signal format.

22. A transmission system as defined in claim 21, wherein said second signal processor includes an input for receiving the audio data signal over which is sent the first control information signal, said second signal processor being operative to:
extract a bit at the selected significance position from selected ones of the data blocks;
shift in the selected ones of the data blocks a bit at a significance position that is lower than the selected significance position to the selected significance position;
assemble the bits extracted from selected ones of the data blocks into the first control information signal;
process the first control information signal to send the second control information signal to said first signal processor.

23. A transmission system as defined in claim 22, wherein the first signal format is audio information that is in a compressed form relative to the second signal format.

24. A transmission system as defined in claim 23, wherein the second signal format is PCM coded audio information.

25. A transmission system as defined in claim 24, wherein the first signal format is VSELP coded audio information.

26. A transmission system as defined in claim 25, wherein each data block is a PCM coded audio sample.

27. A transmission system as defined in claim 26, wherein each PCM sample includes a plurality of bits arranged in significance positions $0, 1, 2, 3, \_N$, where $N+1$ is the total number of bits in the PCM sample, said selected significance position being position 1.

28. A transmission system as defined in claim 27, wherein said first signal processor is operative to insert a bit from the first control information signal in every $M_{th}$ PCM coded audio sample of the audio data signal, where $X>1$.

29. A transmission system as defined in claim 28, wherein M is 16.

30. A digital cellular communication system comprising the transmission system defined in claim 21.

31. A method for transmitting control information over an audio data stream characterized by a plurality of data blocks, each block including a plurality of bits arranged in different significance positions, said method comprising the step of inserting in data blocks of the audio data stream bits from the control information signal, said method being characterized by:
shifting a bit at a selected significance position in a data block to a lower significance position;
inserting a bit from the control signal at the selected significance position of the data block;
releasing the data block with the control signal bit.

32. A method for demultiplexing a compound digital signal into audio data and a control information signal, the compound digital signal being characterized by a plurality of data blocks, each block including a plurality of bits arranged in different significance positions, said method comprising the steps of:
(a) receiving the compound digital signal;
(b) extracting from selected ones of the data blocks at said input bits at a selected significance position;
(c) shifting in the selected ones of the data blocks a bit at a significance position that is lower than the selected significance position to the selected significance position;
(d) releasing the data blocks obtained at (c).

33. A device for transmitting control information over an audio data stream, said device comprising;
first input means for receiving the audio data stream, the audio data stream being characterized by a plurality of data blocks, each block including a plurality of bits arranged in different significance positions;
second input means for receiving a control information signal including a plurality of bits; and control means coupled to said first and second input means to insert in data blocks of the audio data stream bits from the control information signal, said control means including:
- i. means for shifting a bit at a selected significance position in a data block to a lower significance position;
- ii. means for inserting a bit from the control signal at the selected significance position of the data block;

output means coupled to said control means for releasing the data block with the control signal bit.

34. A device for demultiplexing a compound digital signal into audio data and a control information signal, the compound digital signal being characterized by a plurality of data blocks, each block including a plurality of bits arranged in different significance positions, said device including:

input means for receiving the compound digital signal;

control means coupled to said input means, said control means including:
- (a) means for extracting from selected ones of the data blocks at said input a bit at a predetermined significance position;
- (b) means for shifting in the selected ones of the data blocks a bit at a significance position that is lower than the predetermined significance position to the predetermined significance position;

output means coupled to said control means for releasing the data blocks obtained at (b).

35. A data structure containing audio and control information implemented over a machine readable data transmission medium, said data structure having a bit pattern XYZ, where X is a bit set including at least one audio information bit, Y is a bit set including at least one control information bit and Z is a bit set including at least one audio information bit, then bit set Z is shifted up by the number of bits forming the bit set Y a bit word XZ being formed that is characterised by bits arranged in predetermined significance positions, the bits in the word XZ communicating in conjunction with one another audio information.

36. A data structure as defined in claim 35, wherein bit set Y includes a single bit.

37. A data structure as defined in claim 35, wherein bit set Z includes a single bit.

* * * * *